United States Patent [19]

Casati

[11] 4,169,966

[45] Oct. 2, 1979

[54] ELECTRICAL CABLE JOINT CASING

[75] Inventor: Carlo Casati, Arese, Italy

[73] Assignee: Servocavi Societa per Azioni, Novate Milanese, Italy

[21] Appl. No.: 879,142

[22] Filed: Feb. 21, 1978

[30] Foreign Application Priority Data

Feb. 22, 1977 [IT] Italy ............................. 20517 A/77

[51] Int. Cl.² .......................................... H02G 15/18
[52] U.S. Cl. ......................................... 174/92; 174/78
[58] Field of Search ....................... 174/91, 92, 93, 76, 174/78, 88 R

[56] References Cited

U.S. PATENT DOCUMENTS

| 3,619,481 | 11/1971 | Smith ................................ 174/76 X |
| 3,636,240 | 1/1972 | Quante et al. ........................ 174/92 |
| 3,636,241 | 1/1972 | Baumgartner ...................... 174/88 R |
| 3,798,349 | 3/1974 | Thompson et al. .................... 174/92 |
| 3,808,353 | 4/1974 | Burtelson ............................. 174/92 |
| 3,836,694 | 9/1974 | Kapell ................................. 174/92 X |

FOREIGN PATENT DOCUMENTS

| 1540216 | 1/1970 | Fed. Rep. of Germany ............. 174/92 |
| 2004821 | 8/1971 | Fed. Rep. of Germany ............. 174/92 |
| 2011297 | 9/1971 | Fed. Rep. of Germany ............. 174/92 |
| 2244432 | 3/1973 | Fed. Rep. of Germany ............. 174/92 |
| 2158992 | 5/1973 | Fed. Rep. of Germany ............. 174/92 |
| 1371385 | 7/1964 | France .................................. 174/88 R |

*Primary Examiner*—Thomas J. Kozma
*Attorney, Agent, or Firm*—Brooks, Haidt, Haffner & Delahunty

[57] ABSTRACT

A casing for a joint between a pair of electrical cable ends which have been prepared in a conventional manner, the conductors of the cable ends being electrically and mechanically joined and covered with insulation. The casing comprises two mating half-casings of a plastics material having a band, e.g., netting or foil, of good conductivity metal embedded therein and covered thereby, the half-casings enclosing the joint. The band is connected to the cable screeens by flexible conductors, and the casing has tapered ends which receive the ends of the cables and which, preferably, are adhesively secured to the cables. The half-casings are held together by clips, and the casing is filled with a resin after application to the cable ends.

14 Claims, 3 Drawing Figures

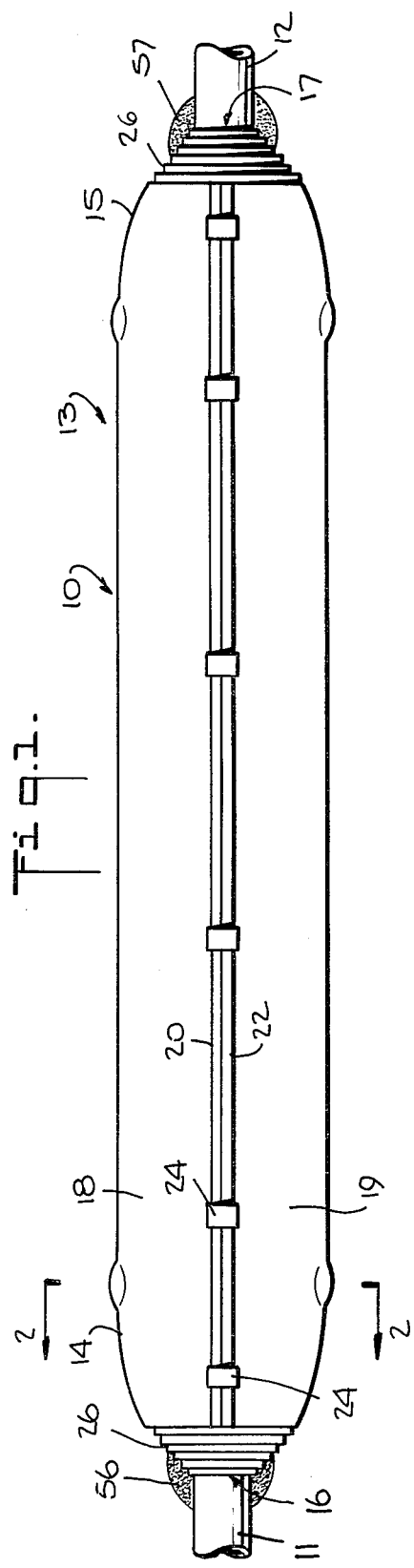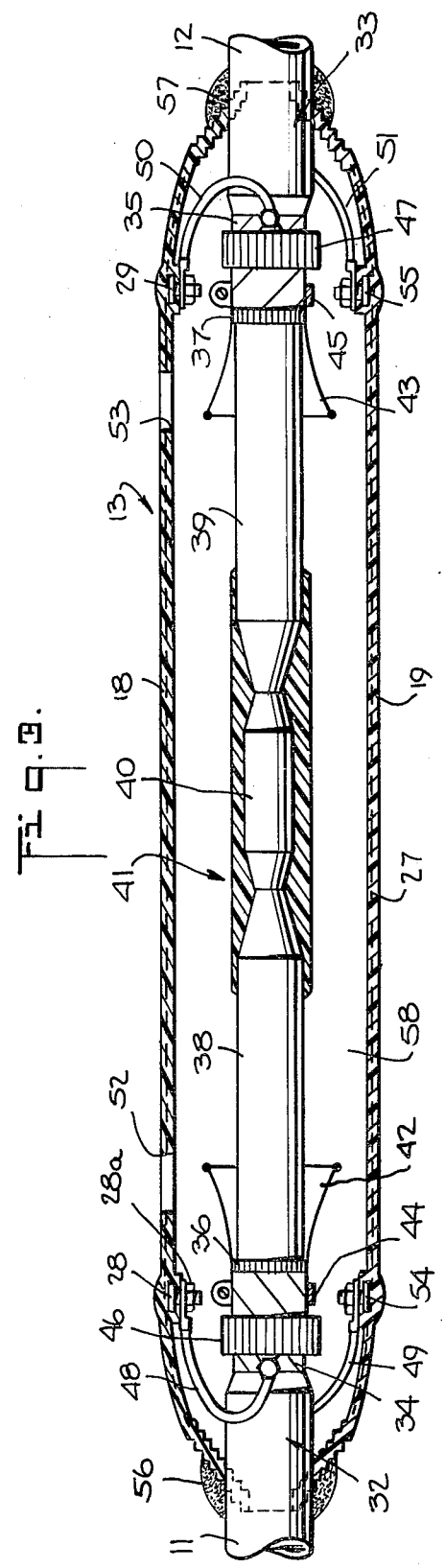

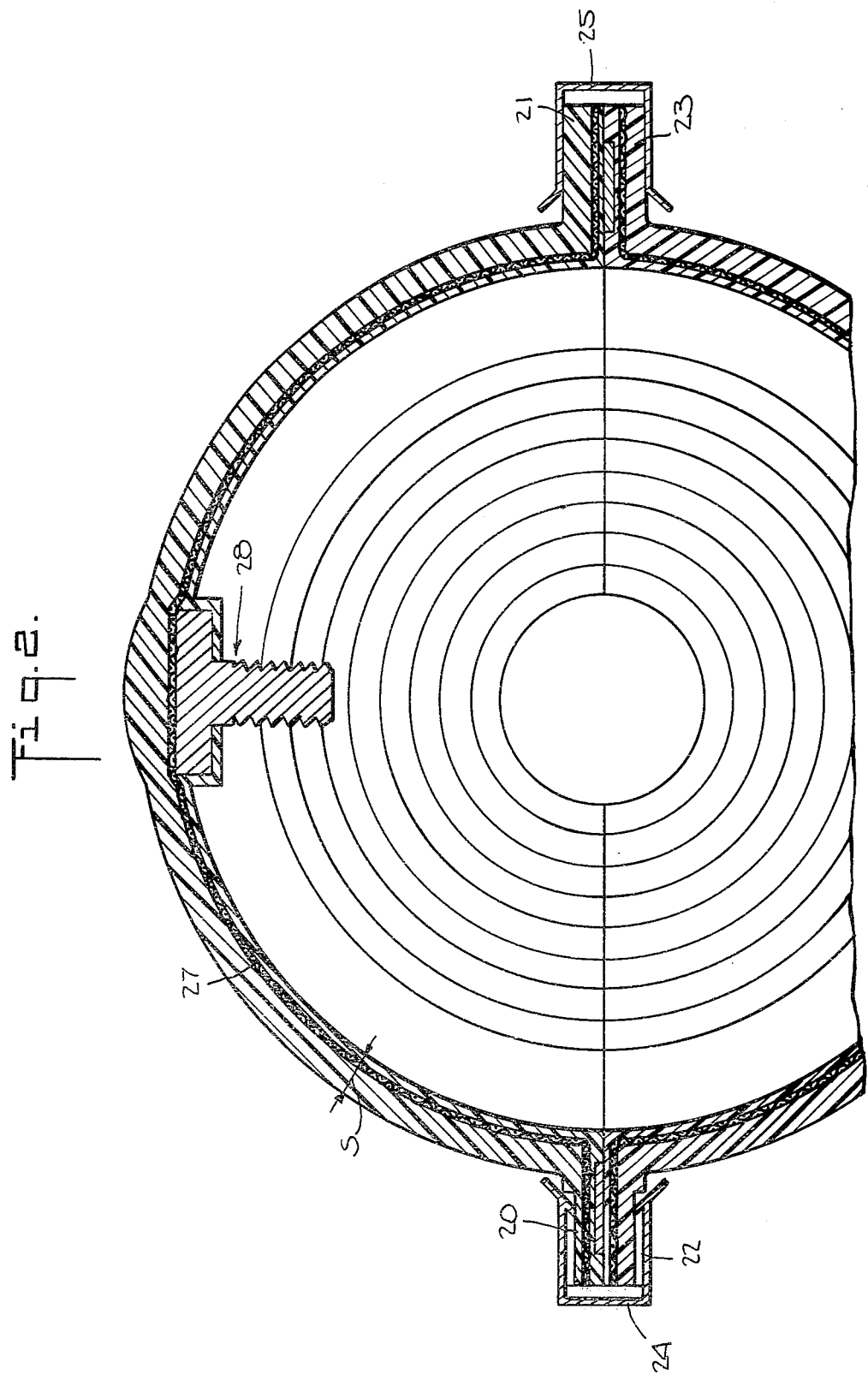

ELECTRICAL CABLE JOINT CASING

The present invention concerns an improved electrical cable joint casing, suitable for use with a composition insulated joint and particularly useful for joints of low and medium voltage cables.

It is known that, when cable lengths are to be joined, the cable insulation is locally removed and the electrical and mechanical continuity of the screen is interrupted. Therefore, both of said elements must be rebuilt before the cable is put into service.

In general, the rebuilding technique is variable according to the type of insulation.

The paper insulated type of cables are protected by a metal sheath, for instance, a sheath of lead. In this case, the usual practice is that of providing a metal casing, also made of lead, around the central portion of the joint. Said casing generally has the shape of a sleeve with tapered lateral portions, the openings in such portions having a size slightly greater than the outer size of the cable sheath to which they are welded.

The application of the lead joint requires particular care. Moreover, a casing of this type, owing to its deformability, may easily be destroyed in the event of accidents of a mechanical nature which may occur. In order to protect the casing against the occurrence of such accidents, the general practice is to provide it with a cover of plastic material, filled with tar or with any other material suitable to fill interspaces, which increases the production cost and the operations required to form a joint.

One of the preferred methods, heretofore used, to form joints between conductors covered with an extruded insulation, includes the rebuilding of the joints by means of special insulating semi-conductor tapes, generally of the self-agglomerating type. A copper tape, intended to rebuild the screen, is arranged on the so formed body. A further tape, for instance of polyvinyl chloride and acting as an outer protection, surrounds the whole.

As is well known to the technicians of this field, a joint of this type requires the abilities of skilled personnel who are able to provide an appropriate tensioning of the tapes. Moreover, the process is effected slowly, and this may leave the cable, on which the joint is to be made, out of service too long.

One object of the present invention is to eliminate all of the above indicated inconveniences, by providing a casing which may be used for joints on cables having different types of insulation, and which combines, in itself, the triple function of container-cover, electrostatic screening and the conductor for the passage of the short-circuit, or ground, currents.

A further advantage of the casing of the invention is that of allowing a simple, expeditious and safe making of the joint, since any welding operation is eliminated.

More precisely, the object of the present invention is a casing which is especially adapted to be used for straight or branch joints in low and medium voltage cables having either a paper or an extruded insulation, said casing being constituted by a screen whose end portions are tapered and provide openings for the cable and comprising two half-casings, an upper one and a lower one, respectively, which are equal in size and specular images and are in mutual contact along a plane passing through the longitudinal axis of the joint, the casing being characterized in that each half-casing is made of plastic material having, embedded in it, a band of a material of good conductivity extending transversally over a width equal to the arc length of the half-casing and at least for a longitudinal length corresponding to the total joint portion of the cable not provided with the screen of the cable.

Other objects and advantages of the present invention will be apparent from the following detailed description of the presently preferred embodiments thereof, which description should be considered in conjunction with the accompanying drawings in which:

FIG. 1 is a side view, partly in cross-section, of a straight-through, cable joint including the casing of the invention;

FIG. 2 is a cross-sectional view of the casing shown in FIG. 1 and is taken along the line 2—2 indicated in FIG. 1; and FIG. 3 is a longitudinal, median, cross-sectional view of the embodiment shown in FIG. 1.

The joint 10 illustrated in FIG. 1 connects two lengths 11 and 12 of a low or medium voltage cable and is externally defined by casing 13.

The casing 13 has the shape of the sleeve, and its end portions 14 and 15 are tapered to form openings 16 and 17 corresponding in size to the outer size of the ends of the cable lengths 11 and 12 to be therein contained. In a preferred embodiment, said tapering is obtained by steps 26 of diameters which decrease towards the respective openings 16 and 17.

The casing 13 comprises two longitudinal half-casings 18 and 19, an upper one and a lower one, respectively, which are equal in size and specular images of each other and longitudinal edges of which are respectively provided with flanges 20 and 21 and 22 and 23, (FIG. 2) directed outwardly of the main portions of the half-casings.

Each flange of a half-casing engages with the corresponding flange of the other half-casing. For example, flange 20 engages with flange 22 and flange 21 engages with flange 23. Appropriate means, for instance, clips 24 and 25 fastened to the pairs of corresponding flanges 20 and 22 and 21 and 23, respectively, keep the two half-casings 18, 19 connected together to form the casing 13. Of course, other and different fastening means may be used.

The casing 13 is made of a plastics material of a type which can be injection molded, for instance, cellulose acetate or another suitable material of a type well-known to those skilled in the art.

A band 27 of a metallic material of good electrical conductivity, e.g, copper, aluminum, etc. is embedded in the plastics material forming each half-casing. Said band 27 extends transversely, or circumferentially, over the whole width of the arc of the half-casing and longitudinally at least for a length corresponding to the total cable portion within the casing 13 which is not provided with the cable screen. Preferably, said band 27 extends from the half-casing to each flange provided on the latter, and for the whole width of the flange, i.e., reaches the free end of the flange itself as shown in FIG. 2.

In a preferred embodiment, the band 27 is a copper net. However, it might consist as well of any other appropriate element, as for instance, a copper foil, a plurality of wires parallel to one another, etc.

In a further preferred embodiment, the band 27 is nearer to the inner surface of the half-casing, than to the outer surface of the half-casing, so that the layer s (FIG.

2) of plastic material present on the band 27 carries out the protective functions which are typical of the outer cable sheath. As mentioned, in the conventional joints, the protective function is provided by a cover over the casing.

In a still further preferred embodiment, the plastics material used for casing 13 is a transparent material such as, for instance, polymethylmethacrylate or another appropriate material. This expedient offers the remarkable advantage that the operator, by visual inspection, may be sure at any time that the joint forming operation proceeds in the best way.

Two grounding terminals 28 and 29 have their heads 30 and 31 also embedded in the plastics material forming the casing 13 and are in conductive contact with said band 27. Moreover, in the example given, said grounding terminals 28 and 29 have the shape of bolts which have flat heads which are soldered to the band 27, and the stems of which are threaded to receive a mechanical fastening, for instance, a nut 28a (FIG. 3). The two grounding terminals 28 and 29 are preferably arranged along the median longitudinal line of the half-casing.

In FIG. 3, where corresponding reference numerals designate the same parts as those described, a casing 13, according to the invention, is applied on a joint between single-core cables 11 and 12 of the medium voltage, solid insulation type. Of course, the same casing can be applied to joints between single-core or multi-core cables having either a solid or a paper insulation, even if said joints are formed according to a technique other than that shown in the example of FIG. 3.

When the cables 11 and 12 are to be joined, predetermined portions of the thermoplastic sheath, 32 and 33 respectively, are removed so that a part of the screen, 34 and 35, made of a wrapping of copper tapes is left bare. Said screen, 34 and 35, could be made of wires or could be formed in any other known manner. As mentioned, the band 27 extends at least from over the end portion of the screen 34 to over the end portion of the screen 35.

Also, the screen, 34 and 35, is removed for a predetermined length so as to bare the outer semi-conductor, or semi-conductive covering, 36 and 37, and at its end, it is provided with a stress-control cone, 42 and 43, locked on the screen by means of an appropriate clamp, 44 and 45 respectively.

The outer semi-conductor is partially removed to expose the corresponding insulation 38 and 39. The latter, cut at its free end by means of a pencil-tip shaped cutting for a predetermined length, together with the inner semi-conductive screen (not visible in the drawing) covered by it, leaves bare the conductors (also not visible in the drawing) which are connected together and encircled by a connector 40. A taping 41 of insulating material, for instance, self-agglomerating rubber, covers the connector 40 and the pencil-tip shaped parts of the insulation 38 and 39, respectively.

A compression element, for instance, a rectangular section spring 46 and 47, is secured on the screen 34 and 35.

Before the casing 13 is applied on the so prepared joint, at least two through holes 52 and 53 are provided in the half-casing 18 intended to be used as upper half casing. Before installing each half-casing 18, 19 to form the casing 13, their ends are adapted to the outer diameters of the cables 11 and 12 by removing the unnecessary portions of steps 26 and 27.

At this time, the connections are effected by mechanically fastening, e.g., screwing the fastening nuts on the stems of the grounding terminals 54 and 55 of the lower half-casing 19, the ends of the strands 49 and 51, to the terminals 54 and 55, respectively, avoiding in this way any soldering or welding. Then, the terminal ends, or lugs, of the two strands 49 and 51 are inserted below the compression elements 46, 47. The terminal ends used to ensure the electrical continuity between the band 27 and the screens 34 and 35 can be of different types (concave or pointed) according to the type of cable (having a solid or a paper insulation).

The same operation is carried out in connection with the upper half-casing 18. The grounding terminals 28 and 29 are connected to the strands 48 and 50, the terminal ends of which are inserted below the compression elements 46, 47. Then, the two half-casings 18 and 19 are closed by mating of the respective flanges 20–23, which are then locked with appropriate clips 24 and 25. Preferably, suitable seats for the clips 24 and 25 are provided on the outer surfaces of the flanges 20–23.

In the preferred embodiment, the ends of the casing 13 so formed around the joint are closed with adhesive cement 56 and 57.

Funnels (not shown) of plastics material, for instance, polyvinyl chloride, are inserted in the holes 52 and 53 and a liquid resin, having a high dimensional stability at the cable service temperature, is poured, through the funnels, into the cavity 58 within the casing 13. Said resin can be, for example, an acrylic type composition. When the resin poured into 58 has sufficiently set, so that no further shrinking will occur, any portions thereof extending beyond the outer surface of the casing 13 are cut away.

During all the steps necessary to assemble the casing, which in the preferred embodiment is made of transparent plastic material, the operator, by virtue of said transparency, may check the joint interior and may act at the right time in the event of failures. Further, owing to the lack of weldings, the casing can be dismantled in a few seconds, if the resin has not yet been poured, and can be rebuilt by using the same half-casings.

The invention has been described in respect of a straight joint but can be equally well applicable to branch joints.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A cable joint between a pair of electric power cables, each of said cables having a conductor surrounded by insulation and a conductive shield around said insulation, the conductor of one said cables being conductively joined at its end to the end of the conductor of the other said cable within said joint and said insulation being removed from each conductor adjacent to the point of the conductive joining thereof, a casing around said joint with its inner surface spaced from each conductor, said casing comprising two similar half-casings which mate along a plane which extends longitudinally of and intersects said joint, each said half-casing being solid and continuous and being made of a transparent plastics material and being shaped to provide a casing with a larger central portion which tapers at its longitudinally opposite ends to smaller end portions having openings therein which, respectively, receive one of said cables around the portion thereof having said insulation, each said half casing having a band of good electrical conductivity material embedded therein immediately adjacent but spaced from the inner surface of the half-casing so that the inner surface of said band facing the cable conductors is covered by material of the half-casing and so that said band is nearer said inner surface of the half-casing than to the outer surface of the half-casing, said band extending from one longitudinal side to the other longitudinal side of the half-casing and extending longitudinally at least over the portions of the cable conductors from which said insulation has been removed, means conductively connecting one end of the band of each half-casing to the conductive shield of one said cable, means conductively connecting the opposite end of the band of each half-casing to the conductive shield of the other said cable, said means and said band interconnecting said shield of said one cable with the shield of the other said cable to provide electrical continuity therebetween, and a solid, cast insulating resin completely filling the interior spaces of said casing intermediate the inner surface thereof and said cables and engaging said inner surface, said resin without said casing providing the insulation required to insulate the conductor ends, said casing also being a protective covering for said insulation and said joint and said band being formed of conductive material with spaces therebetween to provide a multiplicity of openings therein distributed so that parts within the space within the casing can be visually observed through the transparent casing and said openings, prior to the installation of the insulating resin within the casing.

2. A cable joint as set forth in claim 1, wherein, within said joint, a portion of said shield is removed from each cable at its end to provide a predetermined spacing between the screen of one of said cables and the screen of the other of said cables and wherein said band has a length longitudinally of the half-casing in which it is embedded at least equal to said spacing whereby said bands extend at least substantially around the portions of the ends of said cables from which the screen has been removed.

3. A cable joint as set forth in claim 1 wherein said plastics material is cellulose acetate.

4. A cable joint as set forth in claim 1 wherein said band is a copper netting.

5. A cable joint as set forth in claim 1 wherein said band is a plurality of parallel wires.

6. A cable joint as set forth in claim 1 wherein each said half-casing has outwardly extending flanges at the mating surfaces thereof.

7. A cable joint as set forth in claim 6 wherein said band in each half-casing extends into said flanges and to adjacent the outermost ends thereof.

8. A cable joint as set forth in claim 6 further comprising fastening means for securing the flanges of one half-casing respectively to the flanges of the other half-casing.

9. A cable joint as set forth in claim 8 wherein said fastening means are resilient, U-shaped clips for receiving a pair of said flanges therebetween.

10. A cable joint as set forth in claim 1 further comprising at least one grounding terminal mounted on each half-casing and extending inwardly thereof, each said terminal being electrically connected to said band in said half-casing.

11. A cable joint as set forth in claim 10 wherein there are two grounding terminals mounted on each half-casing and extending inwardly thereof, each terminal being electrically connected to said band in the half-casing and said terminals being disposed along the median longitudinal line of the half-casing on which they are mounted.

12. A cable joint as set forth in claim 10 in which said terminal is embedded at one end in the plastics material of the half-casing and has a portion extending from said material and inwardly of the half-casing.

13. A cable joint as set forth in claim 11 wherein said terminal is in conductive contact with the band in the half-casing on which said terminal is mounted.

14. A cable joint as set forth in claim 1 wherein both ends of each half-casing have a plurality of steps which form the tapers at said ends of said central portion of said casing.

* * * * *